Patented May 8, 1934

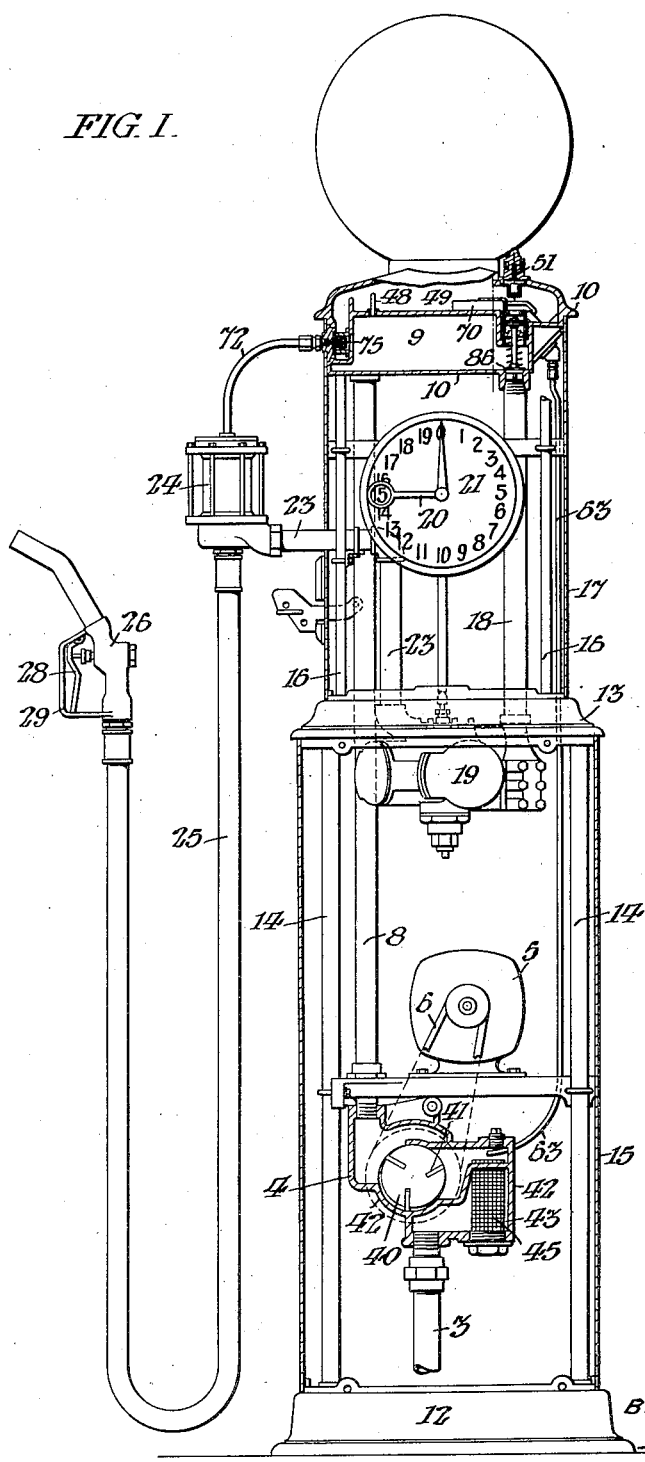

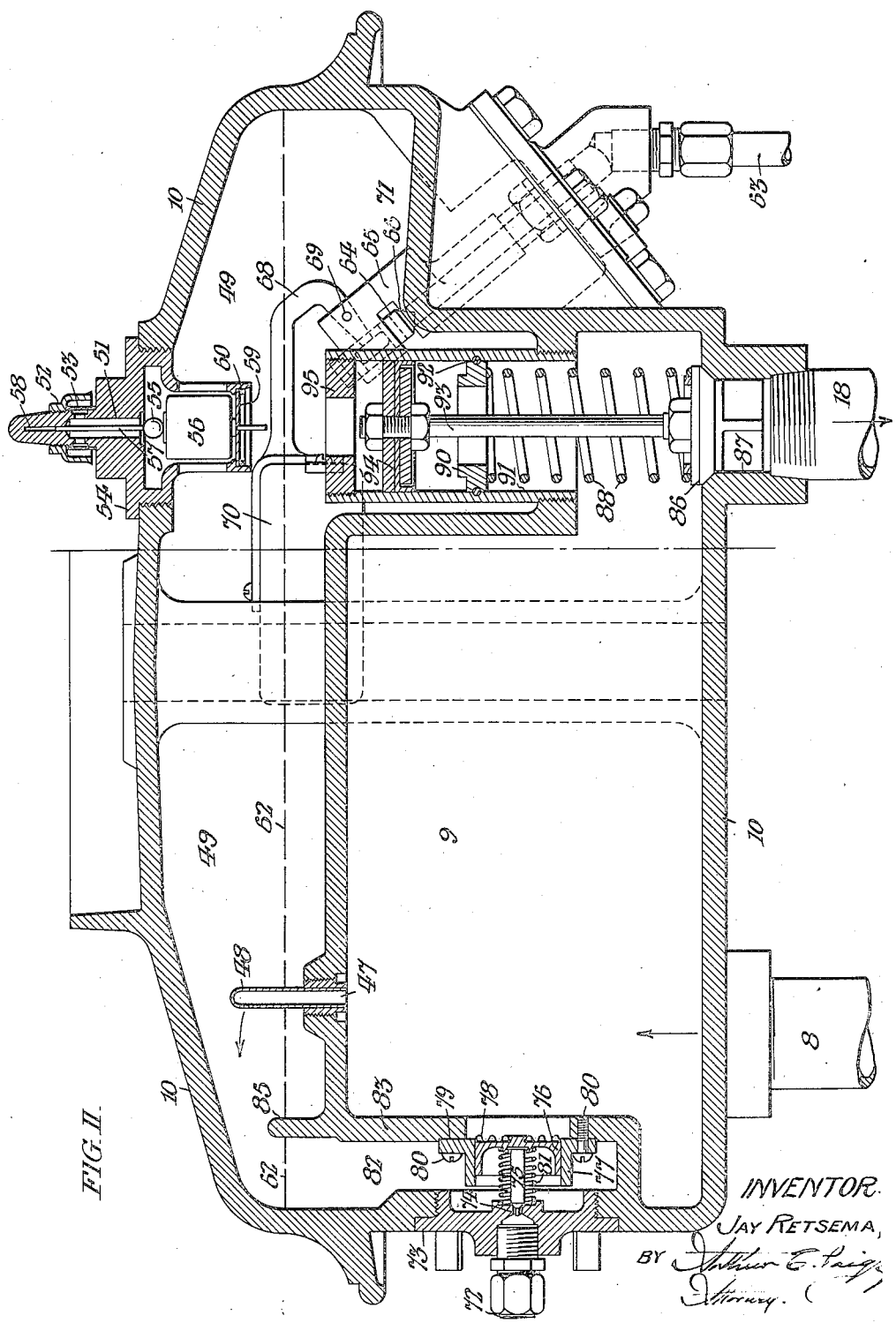
FIG. II.

1,957,910

UNITED STATES PATENT OFFICE 1,957,910

LIQUID DISPENSING APPARATUS

Jay Retsema, Muskegon, Mich., assignor to Service Station Equipment Company, Conshohocken, Pa., a corporation of Delaware Application August 17, 1932, Serial No. 629,091

9 Claims. (Cl. 221—95)

My invention may be advantageously employed in apparatus for dispensing gasolene by means of a pump which extracts the liquid from a subjacent tank and delivers it under pressure through a flow meter and dispensing hose. Said meter includes a rotatable index pointer adapted to traverse a circular series of graduations on a dial to indicate gallons and fractions thereof dispensed, and said pointer is turned by the flow of fluid through said meter. In some localities, the law requires the inclusion of a transparent container between the pump and the hose through which the liquid must pass and in which the purchaser may observe whether or not liquid is being delivered to the hose. If there is a leak in the suction line from the subjacent tank to the pump, air is drawn into the liquid conduit and is manifested by bubbles in the liquid passing through the container and, under some circumstances, bubbles of vapor of the liquid being dispensed may similarly appear. Of course, the passage of air or other gas through the metering pump, in lieu of liquid, renders the manifestation of the amount dispensed erroneous. Therefore, the principal purpose and effect of my invention is to insure the delivery of liquid without the inclusion of bubbles of air or vapor and to the full amount indicated by the meter.

As hereinafter described, the essential feature of my invention is the organization in coordinate relation in a single casing at the top of the liquid dispensing apparatus, of all devices for eliminating air and vapor from the liquid between the pump and meter and such vapor of the liquid as may be generated in the dispensing conduit leading from said casing, and the substitution of liquid from said casing for such generated vapor so as to maintain the liquid free from voids in its presentation to the metering mechanism.

Said casing has two compartments; viz., a lower liquid trap chamber and an upper gas vent chamber with a restricted port between them through which the lighter fluids may pass, with some entrained liquid, and said upper chamber has a vent to the atmosphere for said lighter fluids and a drain outlet for said entrained liquid. Said casing has inlet and outlet conduit means for directing therethrough all of the liquid to be dispensed; and contains four valves, in cooperative coordinated relation, including, first, a valve with a spring for normally closing it, for controlling the outlet from said casing through which the liquid is to be dispensed; that valve having means operative by pressure of the liquid for opening it only at the pressure desired for its dispensation, which facilitates the separation of said lighter fluids from the liquid. Second, a valve controlling re-admission of lighter fluids to said casing from the liquid which has passed said first valve into said outlet conduit, and emission of liquid to replace it. Third, a valve operatively connected with a float, for closing said vent to the atmosphere, if and when the entrained liquid accumulates in said vent chamber above a predetermined level, that valve being normally open to permit free escape of said lighter fluid to the atmosphere from said casing; and, fourth, a valve operatively connected with a float for controlling said liquid drain outlet, which valve is opened when the surplus entrained liquid accumulates in said vent chamber above a predetermined level, and such surplus liquid is returned to the inlet conduit leading to said liquid trap in said casing.

I find it desirable to have the liquid in said casing at a pressure of four pounds or more per square inch before permitting its dispensation, and the first valve aforesaid is so proportioned as to attain that result. The valve controlling admission of lighter fluids to said casing generated from the liquid which has passed said first valve into said outlet conduit, and emission of liquid to replace it, is preferably arranged to be closed by a pressure less than that required to open the valve controlling the pressure of dispensation; for instance, said valve may be closed by a pressure of two pounds per square inch.

In my copending application Serial No. 613,461 filed May 25th, 1932, now Patent No. 1,914,927, granted June 20, 1933, the construction and arrangement of the valves of the first type aforesaid are claimed. The claims in this case are directed to apparatus embodying valves of the second and third types aforesaid.

In said drawings; Fig. I is a partly sectional elevation of liquid dispensing apparatus of the type known as a curb stand, conveniently embodying my invention. Fig. II is a vertical sectional view of the hollow dome at the top of the pump stand casing in Fig. I, but on a larger scale, showing valves of the three types aforesaid and also showing a float valve controlling the discharge of liquid from the gas trap back to the suction side of the pump, which is also a feature of the apparatus disclosed in my patent aforesaid.

Referring to Fig. I; the liquid to be dispensed is stored in an underground tank from which it is withdrawn through the conduit 3 by and to the pump 4 which is conveniently electrically operated by the motor 5 connected therewith by the belt 6. Said pump 4 discharges the liquid through the conduit 8 into the chamber 9 in the trap casing 10 which forms a substantially rectangular dome at the top of the curb stand. Said curb stand includes the substantially rectangular base 12 and the center frame 13 connected by the vertical standards 14, surrounded by the removable sheet metal casing 15. Said center frame 13 is connected with said dome 10 by the standards 16, surrounded by the removable sheet metal casing 17.

Said chamber 9 in the trap casing 10 is connected by the conduit 18 with the flow meter 19 which includes mechanism for turning the indicator 20 with respect to graduations on the circular dial 21, to indicate the volume of fluid dispensed through said flow meter from the conduit 18 to the conduit 23. Said conduit 23 leads into the sight gage 24 which is a vessel having a transparent wall through which the quantity of liquid therein may be observed by the purchaser. When the apparatus is working properly, said sight gage 24 is continually filled with liquid which is, however, dispensable therefrom through the flexible hose 25 and the nozzle 26 under control of a nozzle valve operable by the lever handle 28 within the handle guard 29 on said nozzle.

Said pump 4 is conveniently of the type including a rotor 40 having a circular series of tangential blades 41, which turn in contact with the cylindrical surface in the casing 42. Said casing 42 incloses the screen chamber 43 containing the removable screen 45 through which the liquid passes from the conduit 3 to the conduit 8.

The construction and arrangement above described are such that all of the fluid lifted by said pump 4, and including liquid, air, and other gaseous vapor, is compelled to pass through said trap chamber 9, and the lighter fluids, of course, separate from the liquid in said chamber.

In order to eliminate the gaseous fluids from said chamber 9, I provide the port 47 in the top of said chamber with the vent tube 48 with apertures in the top thereof of such size as to permit free passage therethrough, into the vent chamber 49, of all fluids lighter than the liquid to be dispensed and without building up any back pressure in said chamber 9. The air and other gaseous fluids separated from the liquid in said dome casing 10 escape from said chamber 49 through the vent port 51 in the top of said dome casing 10. Said port 51 is provided with the cowl 52 surrounding the foraminous screen 53 so that ingress of rain or snow is prevented by said cowl and ingress of flame prevented by said screen. Said gas vent port 51 leading to the atmosphere is conveniently formed in the removable screw plug 54 and is controlled by the valve 55 which is operatively connected with the float 56 by the stem 57 which is mounted to reciprocate in the bearing 58 in the top of said plug and in the plate 59 in the bottom of said plug; said plate being removably secured in said plug by the split spring ring 60.

Said gas vent port 51 is normally open to the atmosphere as shown in Fig. II, and is only closed by said valve 55 when the liquid to be dispensed rises to such abnormal level as to lift said float 56 to close said port by the valve 55.

Normally said liquid in the vent chamber 49 is below the level indicated by the dash line 62. When it accumulates above that level, it is drained from said chamber back to the suction side of said pump 4 through the conduit 63 shown in Figs. I and II under the control of the valve 64 which is mounted to reciprocate in the valve casing 65 in registry with the port 66 leading to said conduit 63. Said valve 64 is operatively connected with the lever 68 which is fulcrumed at 69 in said casing 65 and carries at its free end the float 70.

It may be observed that the location of said drain port 66 is such that it is always submerged by liquid in the drain pocket 71, so that it is impossible for the pump to suck air or other gaseous fluid from said chamber 49 when said valve 64 is opened by the rise of liquid in said vent chamber 49.

The apparatus above described is effective to eliminate air and other fluids lighter than the liquid dispensed from such liquid on its way to the sight gage 24, but when said sight gage and hose are exposed to the heat of the sun, vapor may be generated from the gasolene therein and, therefore, I prefer to provide means to vent such vapor from said gage and to maintain the latter always full of liquid, by establishing communication between the top of said gage and said chamber 49 in said dome 10.

Such communication is conveniently established through the conduit 72 which terminates in the removable screw plug 73 in the side wall of said dome casing 10. Said plug 73 has the exchange port 74, for liquid and lighter fluid, controlled by the valve 75 which is carried by the piston 76 which is mounted to reciprocate in the cylindrical bearing 77 and conveniently connected with the flexible diaphragm 78, which is a circular disk the perimeter of which is clamped in the recess 79 by the flange on said bearing 77 which is conveniently secured in said casing 10 by a circular series of screws 80. In order to permit its slight distension corresponding with the opening movement of said valve 75 by the piston 76, said diaphragm 78 is provided with a series of corrugations in concentric relation with the axis of said piston, which engages said diaphragm at the center thereof as indicated in Fig. II. As shown in Fig. II, said valve 75 is normally held open by the spring 81, but is adapted to be closed by liquid pressure upon said piston 76 and said diaphragm 78; that pressure being afforded by the pump 4, whenever the latter is operated, and preliminary to each dispensing operation.

Although said valve 76 is subjected to the same fluid pressure in opposite directions, it presents through the exchange port 74 an area so much smaller than that of the piston 76 as to be closed by a pressure of approximately two pounds per square inch. Therefore, when the pump 4 is idle, during the intervals between liquid dispensing operations, there is free communication between the sight gage 24 and the sump chamber 82 which is formed by the vertical partition 83 in said dome casing 10, and in communication with the vent chamber 49 at the top thereof; so that air or other gaseous fluid may then normally escape from the hose 25 through said sight gage 24 and exchange port 74 to the atmosphere through said vent port 51 in the top of said dome casing 10, and be replaced by liquid caught in said trap and normally at the level 62 from which it gravitates into said sight gage.

As the sight gages 24 are formed of glass, it is desirable to minimize the amount of gasolene which may accidentally escape from the dome casing 10 if and when such a gage is broken.

Therefore, I provide the dome casing with the fence 85 which is high enough to retain in the chamber 49 sufficient liquid to maintain the drain port 66 submerged regardless of any leak through which the liquid above said fence may escape through a broken sight gage.

In order to build up the desired pressure of at least four pounds per square inch before effecting any dispensing operation, I provide the valve 86 for controlling the port 87 leading from the bottom of said trap chamber 9 into the conduit 18, to the flow meter 19. Said valve 86 is normally closed by the pressure of the spring 88 which extends therefrom to the abutment ring 90 which is detachably secured in the cylinder 91 by any suitable means, conveniently the spline 92. However, in order to open said valve 86 at the desired pressure, I provide it with the stem 93 having the piston 94 mounted to reciprocate in said cylinder 91 which is open to the gas vent chamber 49 through the ring 95 which limits the upward movement of said piston and consequent opening movement of said valve 86, so that the latter is continually maintained in proper relation with said port 87.

The area of said piston 94 is greater than the area of said valve 86. When the predetermined desired pressure of the liquid in said chamber 9 is attained, the effect of that liquid pressure upon the piston 94 is sufficient to overcome the combined pressure of said liquid and said spring 88 upon the valve 86, and said valve 86 is then lifted to open position to permit dispensation of the liquid through the conduit 18. The stress of said spring 88 and the area of said piston 94 are so proportioned that the valve 86 is maintained closed by the spring until the desired pressure of the liquid to be dispensed is afforded by the operation of the pump 4.

It may be observed with reference to Fig. II that the valve ports 51 and 87 and the cylinder 91 are in coaxial alinement so that the necessary machining of the dome casing 10 with respect to them and their appurtenant fittings may be effected at one continuous operation, with a consequent economy in the cost of manufacture of the fluid eliminating structure.

The mechanism above described for controlling the port 87 leading from the trap chamber 9 into the flow meter 19 insures that sufficient pressure of the liquid is attained in said chamber 9 to eliminate all fluids lighter than such liquid from that chamber and fill the latter with the liquid; so that only liquid reaches said meter and thus the cheating of the customer by metering air or gasoline vapor, or both, instead of liquid, is prevented.

My invention is advantageous in comparison with structures of the prior art in that it provides, in a single casing 10, at the top of the apparatus, all of the devices necessary to insure the elimination from the liquid to be dispensed of all air and vapors of the liquid which are lighter than the latter and with safety against discharge of the liquid into the atmosphere through the lighter fluid vent and against admission of flame into that casing. Such coordinate organization of all of the air and vapor eliminating devices in a single unit casing permits the assembly thereof in the proper relation at the factory and at minimum cost, and facilitates any repairs thereto which may become necessary after operation of the devices.

Therefore, I do not desire to limit myself to the precise details of construction and arrangement herein set forth, as it is obvious that various modifications may be made therein without departing from the essential features of my invention, as defined in the appended claims.

I claim:

1. Means for eliminating, from liquid dispensing apparatus, fluids lighter than the liquid to be dispensed; including a single casing with a partition dividing it into a lower liquid trap chamber and an upper gas vent chamber; said partition having a port with means for restricting escape of fluid and liquid from said trap chamber into said vent chamber, and said vent chamber having a vent to the atmosphere and a liquid drain outlet; said casing having liquid inlet and outlet conduit means for directing therethrough all of the liquid to be dispensed, and an exchange port for liquid and lighter fluid, between said vent chamber and said outlet conduit; four valves in said casing, in cooperative relation; including, first, a valve having a spring for normally closing it and controlling the outlet from said casing through which the liquid is to be dispensed; that valve having means operative by pressure of the liquid to open it at a predetermined pressure; second, a valve controlling said exchange port, for re-admission of lighter fluid to said casing from the liquid which has passed said first valve into said outlet conduit, and emission of liquid, from said vent chamber, to replace it; that valve having a spring for normally opening it, and means operative by fluid pressure within said casing, for closing it; third, a valve operatively connected with a float, for closing said vent to the atmosphere, if and when the liquid accumulates in said vent chamber above a predetermined level; that valve being normally open to permit free escape of said lighter fluid to the atmosphere from said casing; and, fourth, a valve operatively connected with a float, for controlling said liquid drain outlet from said casing, and which is opened when the liquid accumulates in said vent chamber above a predetermined level; whereby fluids lighter than the liquid to be dispensed are eliminated from the liquid in said trap chamber through said restricted port into said vent chamber and thence to the atmosphere; any fluid lighter than the liquid to be dispensed is eliminated through said vent chamber from the liquid which has passed into said outlet conduit, and is replaced by liquid from said vent chamber; and the surplus liquid carried by the lighter fluids through said port into said vent chamber is returned to the inlet conduit leading to the liquid trap chamber in said casing.

2. Means for eliminating, from liquid dispensing apparatus, fluids lighter than the liquid to be dispensed; including a single casing with a partition dividing it into a lower liquid trap chamber and an upper gas vent chamber; said partition having a port with means for restricting escape of fluid and liquid from said trap chamber into said vent chamber, and said vent chamber having a vent to the atmosphere and a liquid drain outlet; said casing having liquid inlet and outlet conduit means for directing therethrough all of the liquid to be dispensed; three valves in said casing, in cooperative relation; including, first, a valve having a spring for normally closing it and controlling the outlet from said casing through which the liquid is to be dispensed; that valve having means operative by pressure of the liquid to open it at a predetermined pressure; second, a valve controlling re-admission of lighter fluid to said casing from the liquid which has passed said first valve into said outlet conduit, and emission of liquid to replace it; that valve having a spring for normally opening it, and means operative by fluid pressure within said casing, for closing it; third, a valve operatively connected with a float, for closing said vent to the atmosphere, if and when the liquid accumulates in said vent chamber above a predetermined level; that valve being normally open to permit free escape of said lighter fluid to the atmosphere from said casing; whereby fluids lighter than the liquid to be dispensed are eliminated from the liquid in said trap chamber through said restricted port into said vent chamber and thence to the atmosphere; any fluid lighter than the liquid to be dispensed is eliminated through said vent chamber from the liquid which has passed into said outlet conduit, and is replaced by liquid from said vent chamber.

3. Means for eliminating, from liquid dispensing apparatus, fluids lighter than the liquid to be dispensed; including a single casing with a partition dividing it into a lower liquid trap chamber and an upper gas vent chamber; said partition having a port with means for restricting escape of fluid and liquid from said trap chamber into said vent chamber, and said vent chamber having a vent to the atmosphere and a liquid drain outlet; said casing having liquid inlet and outlet conduit means for directing therethrough all of the liquid to be dispensed; three valves in said casing, in cooperative relation; including, first, a valve having a spring for normally closing it and controlling the outlet from said casing through which the liquid is to be dispensed; that valve having means operative by pressure of the liquid to open it at a predetermined pressure; second, a valve operatively connected with a float, for closing said vent to the atmosphere, if and when the liquid accumulates in said vent chamber above a predetermined level; that valve being normally open to permit free escape of said lighter fluid to the atmosphere from said casing; and, third, a valve operatively connected with a float, for controlling said liquid drain outlet from said casing, and which is opened when the liquid accumulates in said vent chamber above a predetermined level; whereby fluids lighter than the liquid to be dispensed are eliminated from the liquid in said trap chamber through said restricted port into said vent chamber and thence to the atmosphere; and the surplus liquid carried by the lighter fluids through said port into said vent chamber is returned to the inlet conduit leading to the liquid trap chamber in said casing.

4. Means for eliminating, from liquid dispensing apparatus, fluids lighter than the liquid to be dispensed; including a single casing with a partition dividing it into a lower liquid trap chamber and an upper gas vent chamber; said partition having a port with means for restricting escape of fluid and liquid from said trap chamber into said vent chamber, and said vent chamber having a vent to the atmosphere and a liquid drain outlet; said casing having liquid inlet and outlet conduit means for directing therethrough all of the liquid to be dispensed; two valves in said casing, in cooperative relation; including, first, a valve having a spring for normally closing it and controlling the outlet from said casing through which the liquid is to be dispensed; that valve having means operative by pressure of the liquid to open it at a predetermined pressure; second, a valve controlling re-admission of lighter fluid to said casing from the liquid which has passed said first valve into said outlet conduit, and emission of liquid to replace it; that valve having a spring for normally opening it, and means operative by fluid pressure within said casing, for closing it; whereby fluids lighter than the liquid to be dispensed are eliminated from the liquid in said trap chamber through said restricted port into said vent chamber and thence to the atmosphere; and any fluid lighter than the liquid to be dispensed is eliminated through said vent chamber from the liquid which has passed into said outlet conduit, and is replaced by liquid from said vent chamber.

5. Means for eliminating, from liquid dispensing apparatus, fluids lighter than the liquid to be dispensed; including a single casing with a partition dividing it into a lower liquid trap chamber and an upper gas vent chamber; said partition having a port with means for restricting escape of fluid and liquid from said trap chamber into said vent chamber, and said vent chamber having a vent to the atmosphere; said casing having liquid inlet and outlet conduit means for directing therethrough all of the liquid to be dispensed; two valves in said casing, in cooperative relation; including, first, a valve having a spring for normally closing it, and controlling the outlet from said casing through which the liquid is to be dispensed; that valve having means operative by pressure of the liquid to open it at a predetermined pressure; second, a valve operatively connected with a float, for closing said vent to the atmosphere, if and when the liquid accumulates in said vent chamber above a predetermined level; that valve being normally open to permit free escape of said lighter fluid to the atmosphere from said casing; whereby fluids lighter than the liquid to be dispensed are eliminated from the liquid in said trap chamber through said restricted port into said vent chamber and thence to the atmosphere; and the accidental discharge of liquid from said vent is prevented.

6. Apparatus as in claim 5, wherein each of said valves is provided with means, normally stationary in said casing, removably supporting it, and both of said valves are in coaxial relation with the outlet from said casing, and a cylinder is supported in said casing between said valves in coaxial alinement therewith, and said first valve is operatively connected with a piston mounted to reciprocate in said cylinder between said valves; whereby the primary assembly and subsequent maintenance of said valves in said casing is facilitated.

7. In liquid dispensing apparatus, the combination with a pump having an intake conduit for connection with a liquid supply, and a liquid discharge conduit; of a liquid meter connected with said pump discharge conduit; a liquid dispensing conduit from said meter; a liquid trap casing at the upper portion of said apparatus, between said pump and meter, for trapping any liquid separated from lighter fluid therein, and having a fluid vent to the atmosphere; a valve automatically controlling communication between said trap and said dispensing conduit; a spring continually stressing said valve toward its closed position; means operatively connected with said valve for opening the latter by pressure of fluid from said pump; and means in said casing restricting communication between said liquid trap and said fluid vent to the atmosphere; whereby said valve is opened only if and when a predetermined pressure of liquid in said casing, upon the means for opening it, is attained.

8. In liquid dispensing apparatus, the combination with a pump having an intake conduit for connection with a liquid supply, and a liquid discharge conduit; of a liquid meter; a liquid dispensing conduit from said meter; and means for eliminating, from said apparatus, fluids lighter than the liquid to be dispensed, including an eliminator casing constructed and arranged as in claim 1, and connected with said pump discharge conduit through said inlet conduit means and with said meter through said outlet conduit means so that all of the liquid to be dispensed must pass through the liquid trap chamber in said eliminator casing, and such fluids be eliminated from the liquid to be dispensed, before said liquid reaches said meter; whereby falsification of the meter manifestation by inclusion of lighter fluids in the liquid is prevented.

9. In liquid dispensing apparatus, the combination with a pump having an intake conduit for connection with a liquid supply and a liquid discharge conduit; of a liquid meter; a liquid dispensing conduit from said meter; a sight gage in the latter conduit; and means for eliminating, from said apparatus, fluids lighter than the liquid to be dispensed, including an eliminator casing constructed and arranged as in claim 1, and connected with said pump discharge conduit through said inlet conduit means and with said meter through said outlet conduit means so that all of the liquid to be dispensed must pass through the liquid trap chamber in said eliminator casing, and such fluids be eliminated from the liquid to be dispensed, before said liquid reaches said meter; whereby falsification of the meter manifestation by inclusion of lighter fluids in the liquid is prevented, and only liquid free from lighter fluid bubbles is visible at said sight gage.

JAY RETSEMA.